United States Patent [19]

Levinson

[11] Patent Number: 5,008,877
[45] Date of Patent: Apr. 16, 1991

[54] OPTICAL SIGNAL RECOVERY FOR DISTRIBUTION COMMUNICATION SYSTEM

[75] Inventor: Frank H. Levinson, Redwood City, Calif.

[73] Assignee: Raychem Corp., Menlo Park, Calif.

[21] Appl. No.: 120,308

[22] Filed: Nov. 12, 1987

Related U.S. Application Data

[63] Continuation-in-part of Ser. No. 935,458, Nov. 25, 1986.

[51] Int. Cl.⁵ .............................................. H04J 14/08
[52] U.S. Cl. ........................................ 370/4; 455/608
[58] Field of Search ................... 370/4; 455/603, 606, 455/607, 608, 612, 617, 618, 619

[56] References Cited

U.S. PATENT DOCUMENTS

| | | | |
|---|---|---|---|
| 3,732,374 | 4/1973 | Rocher | 370/85 |
| 4,161,786 | 7/1979 | Hopkins | 370/85 |
| 4,360,910 | 11/1982 | Segal | 370/85 |
| 4,532,627 | 7/1985 | Smitt | 455/612 |
| 4,547,879 | 10/1985 | Hamelin | 370/85 |
| 4,569,045 | 2/1986 | Schieble et al. | 370/85 |
| 4,574,305 | 3/1986 | Campbell et al. | 455/5 |
| 4,630,256 | 12/1986 | Albanese | 370/3 |
| 4,654,843 | 3/1987 | Roza et al. | 370/20 |
| 4,654,889 | 3/1987 | Shutterly | 370/89 |

OTHER PUBLICATIONS

Stout et al., "Handbook of Operational Amplifier Circuit Design", pp. 8–11, 1976.

Primary Examiner—Reinhard J. Eisenzopf
Assistant Examiner—Leslie Van Beek
Attorney, Agent, or Firm—Dennis E. Kovach; Herbert G. Burkard

[57] ABSTRACT

A bus receiver communicates with a bus head end transmitter via a communication path different from read and write optical fibers used by a plurality of remote terminals on the bus so that the bus receiver can quickly determine beginning and end of time slots, clock frequency, and signal trigger levels using a minimum amount of bits attached to a front end of each packet in each time slot.

16 Claims, 2 Drawing Sheets

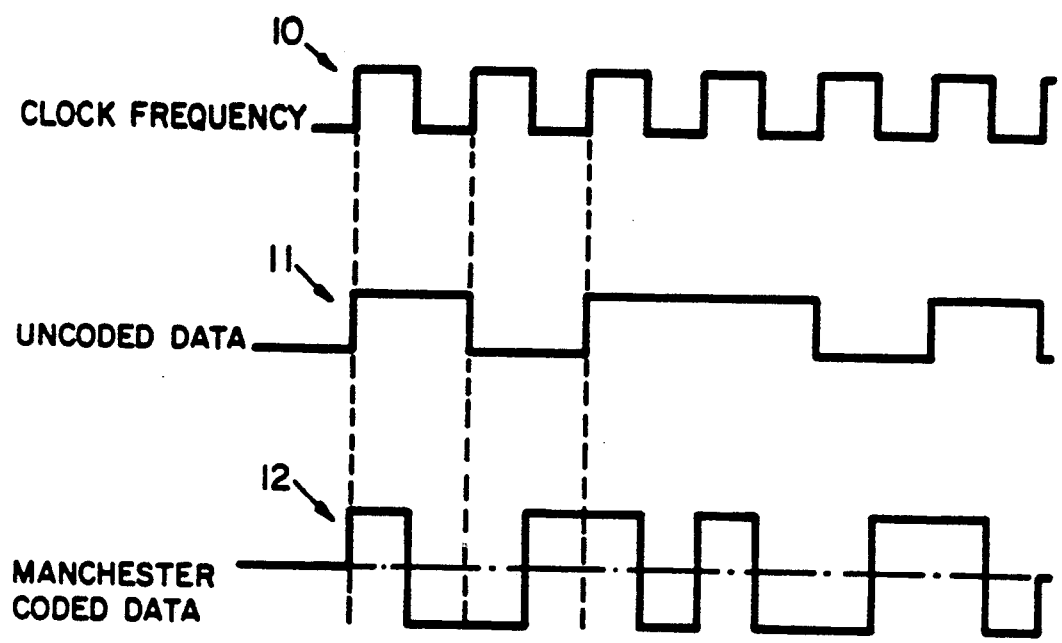
FIG_1
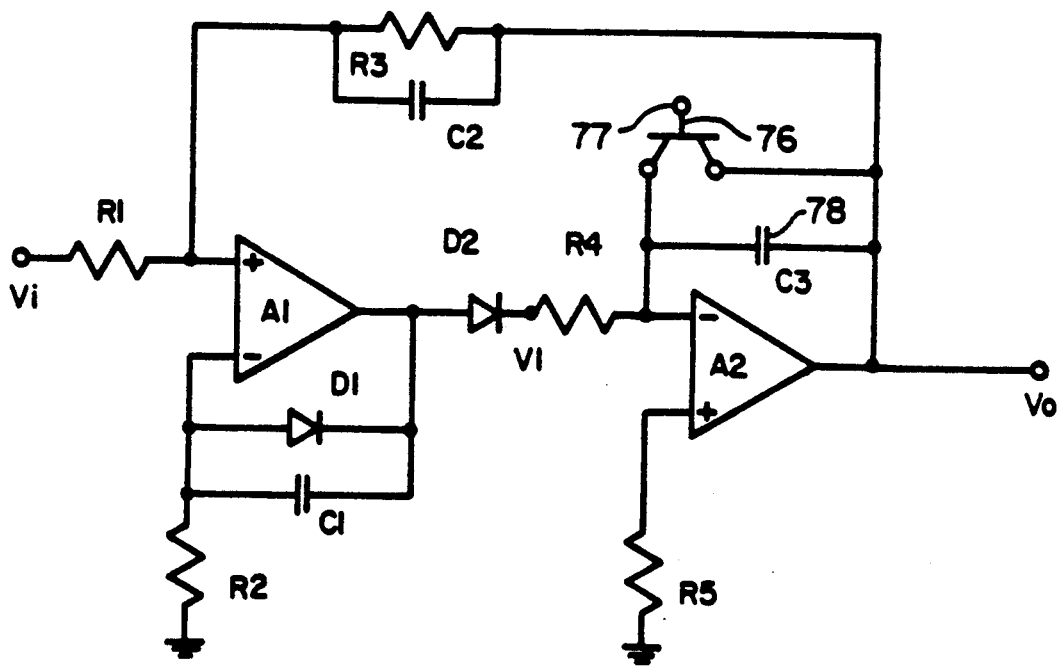
FIG_5

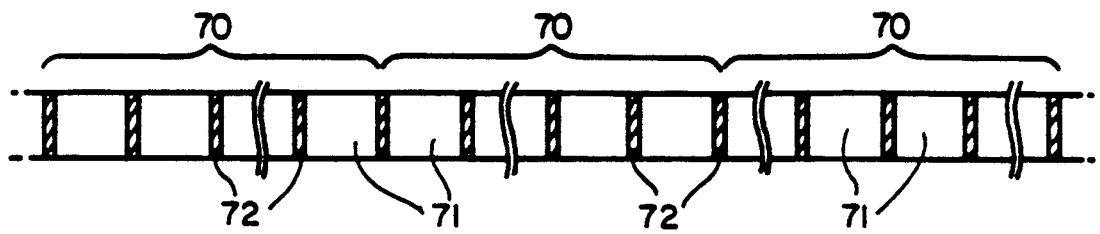
FIG_2
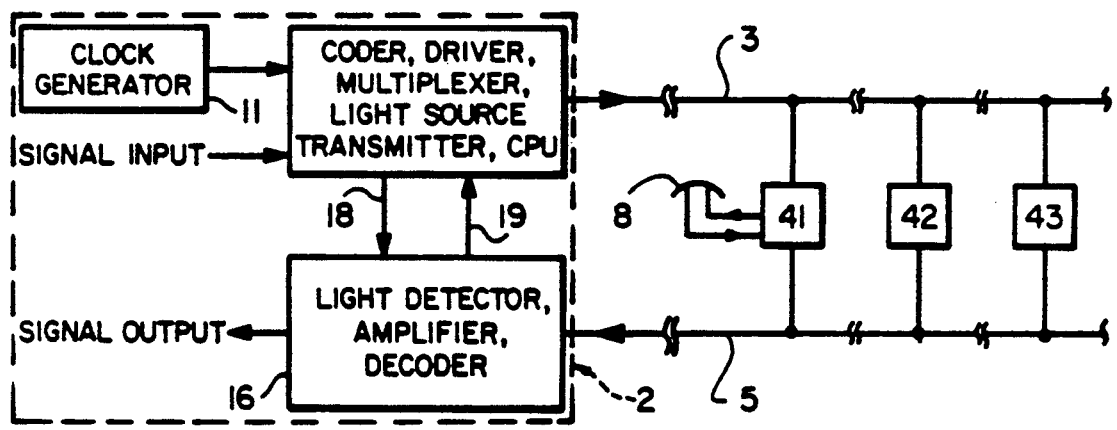
FIG_3
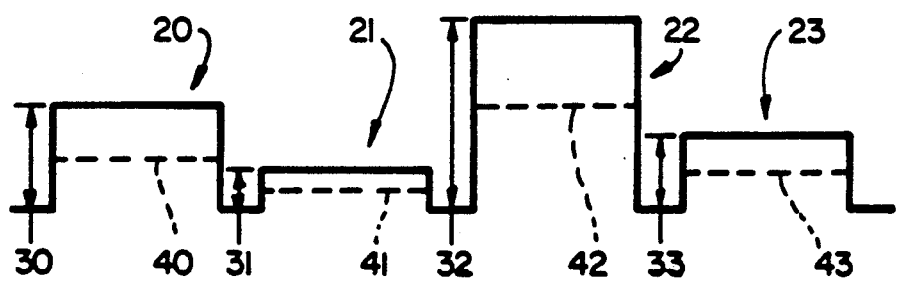
FIG_4

OPTICAL SIGNAL RECOVERY FOR DISTRIBUTION COMMUNICATION SYSTEM

REFERENCE TO RELATED APPLICATION

This application is a continuation-in-part of U.S. Ser. No. 935,458, filed Nov. 25, 1986, assigned to the assignee of the present case, the disclosures of which are incorporated herein by reference.

BACKGROUND OF THE INVENTION

The present invention relates to an improved means for recovering an optical signal for an optical receiver in an optical fiber asynchronous distribution network.

In an optical fiber bus distribution network, when an optical receiver receives information from a remote source, it is necessary for the receiver to first determine the decision threshold or decision trigger level for incoming signals to be decoded. The threshold or trigger level for an optical detector which utilizes electronics for decoding is generally a voltage which represents either a logic high or a logic low. For such a detector to operate effectively the clock frequency or clock rate at which the light pulses representative of information being sent has been generated must be determined so that the receiver can "lock on" to this clock frequency and accordingly accurately read all the light pulses being sent. If the receiver does not lock onto the appropriate threshold level and actual clock frequency, then the receiver is likely to output significant quantities of bit errors.

As used throughout herein, the "clock frequency" represents the number of the light pulses which are sent per unit time (e.g. 100 megabits/sec), and does not refer to the wavelength or frequency of the light used to generate any given pulse (e.g. typical wavelengths being 820 nm, 1300 nm, and 1500 nm).

Prior art attempts at locking onto the appropriate threshold and actual clock frequency by which data is generated and sent comprise dedicating a predetermined relatively large number of bits at a beginning of a packet of data for these functions, e.g. these bits contain no real data and simply constitute a plurality of logic highs and logic lows in a series long enough for the detector or receiver to lock onto the actual clock frequency for the data packet being sent. Thereafter, the receiver continues to track the clock frequency by continuously detecting light pulses from the source generating the light pulses.

Though such a procedure is acceptable in a synchronous network having only one source and one clock where the clock frequency once determined remains relatively constant over time, such a procedure is disadvantageous in an asynchronous bus network where data is being sent by and received from numerous remote terminals separated geographically since the particular clock frequency and threshold level for each packet of data sent by each terminal is unique to its particular clock and therefor must be determined by the receiver each time a packet of data from a different source is to be detected. In this situation, dedicating a relatively large number of bits for clock and threshold level recovery for each packet results in a disadvantageous large bit overhead for the network which results in less of the network bandwidth being available for actual data transfer.

SUMMARY OF THE INVENTION

Accordingly, it is object of the invention to eliminate the above-noted drawback of the prior art and to provide an apparatus for setting of threshold and recovering clock in a more rapid, efficient and simpler manner in an asynchronous bus network.

Specifically, according to the invention, a receiver for detecting light pulses representative of information generated by a plurality of remote terminals in a plurality of packets each separated and multiplexed in time, each packet having a beginning and an end, includes means for receiving and detecting the light pulses along a first path between the remote terminals and the receiver, and means for receiving secondary signals along a second path between a head end and the receiver which is different from the first path. Preferably, the second path is not connected to any of the remote terminals, the second path being disposed entirely within a head end and being shorter than 10 meters.

More specifically, according to the invention, an optical fiber bus distribution network comprises a synchronous read bus whereby information being sent to the plurality of remote terminals is done so by a head end and its transmitter in a synchronous manner at a predetermined clock frequency or rate; the remote terminals receiving this information along with the predetermined actual clock frequency with the plurality of remote terminals thereafter sending information out on a network write bus in an asynchronous manner at the predetermined clock frequency in a packet time multiplexed manner. The head end receiver which receives and reads this asynchronous information, with each arriving packet potentially having a substantially different optical power level from the preceding packet. The head end receiver derives frequency information from the head end transmitter via secondary signals sent between the head end and the receiver, rather than deriving the entire clock information (i.e. both frequency and phase) from the asynchronous packets. Accordingly, since it is the head end which determines the clock frequency by which the remote terminals transmit, the receiver requires very few bits to be generated by the remote terminals that are dedicated to an algorithm for allowing the head end receiver to derive the necessary clock phase for each packet generated by a new source.

According to a preferred embodiment, the head end further allocates time slots for the individual remote terminals during which these remote terminals send data to the receiver. With such a procedure, the head end receiver continuously knows the clock frequency at which it is and will receive data and also knows precisely when any given packet from any given remote terminal will end. Accordingly, the head end receiver can quickly reset a threshold or trigger light intensity signal level and needs only determine the phase of the light pulses being sent by each of the remote terminals, which allows the asynchronous information to be received in a very efficient manner since phase can be recovered using relatively few bits.

BRIEF DESCRIPTION OF THE DRAWINGS

FIG. 1 illustrates in schematic form a clock pulse and an uncoded and coded means for transmitting data at a given clock frequency;

FIG. 2 illustrates a plurality of time slots ordered by packets and frames;

FIG. 3 illustrates one preferred embodiment of an optical fiber distribution network utilizing the invention;

FIG. 4 illustrates in schematic form different levels of maximum light intensities detected by a receiver illustrated in FIG. 3; and FIG. 5 illustrates one means for resetting a trigger level of the receiver.

DESCRIPTION OF THE PREFERRED EMBODIMENTS

FIG. 1 schematically illustrates a clock pulse stream 10 which is typically used by a transmitter in high speed networks to regulate the frequency by which bits of data are generated and sent, and by a receiver to regulate the frequency by which the bits of data are to be sampled and read. Though the clock frequency represented can change slightly over time due to dynamic system variables, such as changes in environmental temperature, for practical purposes any change in the clock frequency 10 is extremely gradual, and it is a relatively minor matter for a receiver to continuously keep accurate track of the actual clock frequency from a single transmitter assuming that information is continuously sent by the transmitter by a coding scheme which guarantees that both ON and OFF light pulses are intermittently being sent.

More specifically, referring to FIG. 1, if "1s" and "0s" are respectively delineated by ON and OFF light pulses respectively, if uncoded data 11 is sent, the possibility exists that a situation will arise where an extensive string of bits will be identical, e.g. either "1s" or "0s", and accordingly at high bit rates a possibility exists that the receiver will loose track of the actual clock frequency and therefore "miss" or make errors in reading the first several bits after the long continuous bit stream has ceased to be constant.

To avoid such a problem, it is oftentimes desirable to encode the data using some kind of encoding technique which guarantees that both ON and OFF light pulses will be generated even if the actual signal being generated constitutes all ones or all zeros. A known encoding scheme known as Manchester encoding is illustrated in FIG. 1 by reference numeral 12. According to Manchester encoding a "1" is represented by an ON and then an OFF state whereas a "0" is represented by an OFF and than an ON state. With such an encoding scheme, it is evident that regardless of the nature of the signal being sent, e.g. be it intermixed "1s" and "0s" or continuous "1s" or continuous "0s", the receiver will continuously read high and low light levels and be able to lock onto the clock frequency and track any small variations which may occur thereto, so that no part of the signal is ever lost by a loss of the clock frequency. Encoding schemes other than Manchester are also known in the art.

FIG. 2 illustrates a time division multiplex format usable with the invention whereby information is sent in the form of packets of data within discrete time slots 71, with groups of time slots 71 forming repeating frames 70, the frames 70 being of predetermined time duration with the time slots 71 being separated by dark space 72. The dark space 72 between the individual time slots 71 is necessary to insure that adjacent time slots 71 do not overlap. When different transmitters separated geographically transmit the various packets transmission frequency can vary since the propagation speed of the light sent by each transmitter is highly dependent on transmitted light wavelength which can and generally is different for identical type transmitters due to gitter and temperature variations. The length of the packets and frames can vary depending on network requirements. As an example only, a frame can comprise one millisecond and a packet 50 microseconds (including its associated clock space) when 20 packets per frame are desired.

FIG. 3 illustrates a distribution architecture usable with the invention which includes a read or listen bus 3 from which a plurality of remote terminals 41, 42, 43, etc. receive information in the form of light pulses from a head end 2, and a write or talk bus 5 onto which the remote terminals 41, 42, 43, etc. transmit information to a head end receiver in the form of light pulses. The remote terminals preferably are distributed geographically in metropolitan, urban, or rural areas and are connected to telephones, computers, radios, or televisions, a preferred use being telephones and computers. Preferably the terminal most remote from the head end is more than a kilometer therefrom, more preferably more than 2, 3, 4, 5 or even 10 kilometers therefrom, the maximum distance being governed by available signal strength and available bandwidth.

Referring to FIG. 3, the head end 2 includes a central processing unit which assigns one or more unique time slots 71 to the various remote terminals 41, 42, 43, etc. within which each terminal can transmit data on the write bus 5, the unique time slots 71 being located at a constant position in time relative to a beginning of each frame 70. Data is sent to the remote terminals in time slots on the listen bus 3 by a head end transmitter which includes a light source, with destination and origination addresses preferably being included in the data sent in packet form to the remote terminals 41, 42, 43, etc., the remote terminals also preferably using destination and origination addresses for all data sent on the talk bus 5 to a bus receiver 16.

According to a preferred embodiment, when any remote terminal requires two way communication, a time slot is allocated thereto by the head end CPU which can be achieved by the head end CPU pooling each remote terminal intermittently. Preferably, though not necessarily, each remote terminal writes on the bus 5 in time slots identical in time within each frame as the time slots being used for sending information to that remote terminal on the listen bus 3.

In the network of FIG. 3, the data is all generated and sent on the listen bus 3 by a single transmitter included within the head end, and hence it is a simple matter to send this data in synchronous time slots in synchronous frames at a constant clock frequency determined by clock generator 11. On the other hand, since the remote terminals 41, 42, 43, etc. separated in space, to prevent data generated by one remote terminal in a first time slot from overlapping onto data generated by another remote terminal using an adjacent time slot, gaps 72 must be provided at the beginning and/or end of the time slots to ensure that a separation between adjacent time slots always exists, as explained previously. In addition, assuming each remote terminal uses its own internal clock for signal generation the bus receiver 16 must recover each clock frequency each time a new packet of data is to be received.

According to the invention, each remote terminal generates its data at the clock frequency used by the head end transmitter which is sent to the remote terminals via a first path, e.g. the listen bus 3, and this particular clock frequency is transmitted by the head end to the bus receiver 16 via a second path 18 which is different than the first path. According to a preferred embodiment, the bus receiver is located in close proximity to the head end transmitter, and the path 18 can be an electrical or optical circuit. For example, for two way telephone transmission whereby a telephone 8 communicates with a remote terminal, the head end 2 and bus receiver 16 and associated electronics can all be housed in a common housing containing necessary circuit boards and microelectronic circuits.

Preferably the signals which are sent from the head end 2 to the bus receiver 16 along the second path includes the clock frequency, and in addition an indication of when any time slot allocated to any remote terminal will begin and end, the remote terminal's identity, and the trigger level or threshold for that terminal and in particular the data being sent thereby. Accordingly, the receiver 16 thus knows the clock frequency by which data will be received in packet form in asynchronous time slots, and precisely when the packets to be received will begin and end. Hence, minimal bit overhead for clock recovery is required since the receiver need only determine the phase of the incoming data which requires as little as a few bits for each packet, for example less than 5, 10, 15, or 20 bits.

An additional advantage of the invention is appreciated by referring to FIG. 4 which schematically illustrates different levels of signal intensities read by the head end receiver 16 of light generated by any one of the remote terminals 41, 42, 43, etc. Specifically, FIG. 4 illustrates four consecutive packets being received by the receiver 16, packets 20, 21, 22, 23. Within each packet various "1s" and "0s" are contained, these "1s" and "0s" being ON and OFF levels representative of information being sent. If the remote terminals 41, 42, 43, etc. are distributed over a large geographic distance, for example over a kilometer, 2 kilometers, 4 kilometers, 10 kilometers, or in excess thereof, it is evident that light attenuation along the talk bus 5 will be different for different remote terminals. Accordingly it is evident the signal amplitudes received by the bus receiver will be unequal. The differences are amplified if the strength of the light sources used by the various remote terminals significantly vary.

FIG. 4 illustrates such a situation whereby a first and fourth packet 20, 23 in time slots separated by packets 21, 22 have intermediate maximum signal amplitudes 30, 33, respectively, with the second packet 21 having a low maximum signal amplitude 31, and the third packet 22 having a high maximum signal amplitude 32. When receiving and decoding information, the optical receiver 16 typically identifies a trigger level 40, 41, 42, 43 or some parameter (e.g. voltage) proportional to the light pulse intensity which lies somewhere between a minimum and maximum level, with the receiver 16 determining "1s" from "0s" on the basis of whether the detected parameter is either above or below the trigger level being used. Alternatively, if analog data is being received, a magnitude of the parameter amplitude from a predetermined threshold value is needed to decode information represented by the light pulses.

In a typical receiver, if the trigger level being used by a receiver detecting light pulses in a packet is lower than a trigger level to be used for light pulses in the next immediate packet, such as occurs between packets 21 and 22, little difficulty exists in receiver operation since receivers are quite capable of determining a new higher trigger level 42 and adjusting its trigger level to that level rather quickly, e.g. within a few bits at modest bit rate speeds. However, a problem exists with receivers when a following packet 23 has a lower trigger level 43 than a preceding packet 22 since it takes a relatively long period of time for the receiver to reset and lower its trigger level. Accordingly, numerous bits are required at the beginning of the packet 23 to allow time for the receiver to appropriately adjust its trigger level to a value equal to the value 43, or to determine appropriate magnitudes for accurate analog decoding.

According to the invention, this problem is alleviated since the signals sent to the receiver 16 along the path 18 can also indicate to the receiver 6 what the trigger level of the next packet to be received will be. In the case where the next packet 23 has a lower trigger level 43 than a preceding packet 22, circuitry such as AND/OR logic gates can be activated to quickly lower the threshold value.

FIG. 5 illustrates one such embodiment whereby a transistor 76 is activated by a signal on line 77 so as to discharge capacitor 78 used in the receiver 16 for setting a high trigger level, thus quickly resetting the trigger level to a low value.

According to preferred embodiments of the invention, the bus receiver 16 is capable of transmitting information to the head end 2 via path 19 so that trigger levels once identified for each remote terminal can be sent to and stored by the head end CPU which then informs the receiver 16 of the trigger level to be used since the CPU allocates time slots to the remote terminals and performs other control functions.

Though the invention has been described by reference to certain preferred embodiments thereof, it is not to be limited thereby, and only by the appended claims.

I claim:

1. A distribution communication system, comprising:
   a head end including a transmitter, a receiver, and a clock generator which generates a system clock frequency from which a packet transmission frequency can be derived;
   a plurality of terminals remote from the head end;
   first means for transmitting first information from the transmitter to the remote terminals and for transmitting second information from the remote terminals to the head end receiver, the first information being encoded so that the system clock frequency is derivable therefrom by the remote terminals, the terminals transmitting the second information onto a talk bus in an asynchronous time multiplexed packet format utilizing a plurality of packets which are out of phase with one another, the second information being transmitted at a transmission frequency;
   second means for transmitting the system clock frequency within the head end from the clock generator to the head end receiver along a communication path different from that defined by the first means and which is located entirely within the head end.

2. The system of claim 1, the head end transmitter transmitting the first information in a synchronous format at the system clock frequency along the first means.

3. The system of claim 1, the transmission frequency being derived from the system clock frequency.

4. The system of claim 1, the communication path not being connected to any of the remote terminals, the communications path being less than 10 meters.

5. The system of claim 1, the first means comprising a listen bus and a write bus.

6. The system of claim 5, the first means including optical fibers.

7. The system of claim 1, further comprising means for transmitting when any time slot allocated to any remote terminal will begin and end and a threshold intensity for data in the allocated time slot from a central processing unit in the head end to the head end receiver along the communication path.

8. The system of claim 1, at least one of the terminals being located more than a kilometer from the head end.

9. The system of claim 1, the communication path being shorter than 10 meters.

10. The system of claim 1, the telecommunication equipment including a telephone.

11. A method of decoding asynchronous information transmitted by a plurality of remote terminals comprising the steps of:
generating a master clock frequency;
transmitting the master clock frequency to the remote terminals along a first transmission line by encoding this frequency within data transmitted to the remote terminals and to be used by at least some of the remote terminals for operating telecommunication equipment;
transmitting the master clock frequency to the head end receiver from a master clock generator along a second transmission line which is different than the first transmission line and which is located entirely within the head end;
receiving signals in an asynchronous format from the remote terminals using a receiver.

12. The method of claim 11, at least one of the remote terminals being located more than a kilometer from the receiver.

13. The method of claim 11, the second transmission line being shorter than 10 meters.

14. The method of claim 11, the terminals injecting the information onto a talk bus in asynchronous time multiplexed packets, each of the packets being formated using a frequency derived from the master clock frequency and being out of phase with one another.

15. The method of claim 14, further comprising the step of transmitting approximate start and end of packet times to the receiver and approximate trigger level values to the receiver along the second transmission line to enable the receiver to anticipate when packets will begin and end and an approximate trigger level for bits contained therewithin.

16. The method of claim 15, further comprising the step of transmitting trigger level values from the receiver to a head end central processing unit.

* * * * *